United States Patent
Uhlenbrock et al.

(10) Patent No.: US 10,861,173 B2
(45) Date of Patent: Dec. 8, 2020

(54) HOLE-BASED 3D POINT DATA ALIGNMENT

(71) Applicant: THE BOEING COMPANY, Chicago, IL (US)

(72) Inventors: Ryan M. Uhlenbrock, Camarillo, CA (US); Deepak Khosla, Camarillo, CA (US); Anthony W. Baker, Gilbertsville, PA (US)

(73) Assignee: THE BOEING COMPANY, Chicago, IL (US)

( * ) Notice: Subject to any disclaimer, the term of this patent is extended or adjusted under 35 U.S.C. 154(b) by 194 days.

(21) Appl. No.: 16/016,307

(22) Filed: Jun. 22, 2018

(65) Prior Publication Data

US 2019/0392595 A1 Dec. 26, 2019

(51) Int. Cl.
*G06T 7/33* (2017.01)
*G06T 7/73* (2017.01)
*G06T 1/00* (2006.01)

(52) U.S. Cl.
CPC ............ *G06T 7/337* (2017.01); *G06T 1/0014* (2013.01); *G06T 7/74* (2017.01); *G06T 2207/10028* (2013.01); *G06T 2207/30164* (2013.01)

(58) Field of Classification Search
CPC .......... G06T 7/337; G06T 7/74; G06T 1/0014
See application file for complete search history.

(56) References Cited

U.S. PATENT DOCUMENTS 3,069,654 A 12/1962 Hough
9,748,128 B1 * 8/2017 Chao ................... G03F 7/70633
2013/0004060 A1 * 1/2013 Bell ....................... H04N 13/257
 382/154
2015/0254857 A1 * 9/2015 Huang ..................... G06F 19/00
 382/154
2017/0046840 A1 * 2/2017 Chen ..................... G06K 9/4604

OTHER PUBLICATIONS

Akinci, B. et al., "A Formalism of Utilization of Sensor Systems and Integrated Project Models for Active Construction Quality Control," Automation in Construction 15.2, 2006, pp. 124-138.
Kazhdan, M. et al., "Screened Poisson Surface Reconstruction," ACM Trans Graph 32, 3, Article 29, Jul. 2013, 13 pgs.
Maisonobe, L., "Finding the circle that best fits a set of points," Oct. 25, 2007, <https://www.spaceroots.org/documents/circle/circle-fitting.pdf, pp. 1-11.
Martinez, S. et al., "Analysis of laser scanning and strategies for dimensional and geometrical control," International Journal of Advanced Manufacturing Technology, 2001, pp. 621-629.
Gelfand, Natasha et al. "Robust Global Registration," Eurographics Symposium on Geometry Processing, 2005, 10 pgs.

* cited by examiner

*Primary Examiner* — Leon Flores
(74) *Attorney, Agent, or Firm* — Moore IP Law

(57) ABSTRACT

A method includes generating, based on first surface data that includes three-dimensional (3D) point positions corresponding to a first portion of a surface of an object, first hole data that indicates first positions of holes in the first portion of the surface. The method includes generating, based on second surface data corresponding to a second portion of the surface of the object, second hole data that indicates second positions of the holes in the second portion of the surface. The method also includes matching the first positions to the second positions to perform an alignment with respect to the first surface data and the second surface data.

20 Claims, 7 Drawing Sheets

HOLE-BASED 3D POINT DATA ALIGNMENT

FIELD OF THE DISCLOSURE

The present disclosure is generally related to aligning three-dimensional (3D) point data representing portions of a surface of a scanned object.

BACKGROUND

Manufacturing of components, such as aircraft components, often involves performing a three-dimensional (3D) scan of a manufactured part and generating a 3D model of the part from the scan data. When an object to be scanned is larger than a field of capture of a 3D sensor, a scan of the object is performed by combining multiple scans of overlapping portions of the object. To generate a 3D model, the scan data from the multiple scans may be automatically aligned based on distinctive features that are detected in the overlapping portions and combined into a 3D model. However, when an object has a smooth, featureless surface, alignment of the scan data may have to be performed manually due to an insufficient number of distinctive features in the scan data. Manual alignment of scan data causes an increased time and cost of the manufacturing process as compared to feature-based automatic alignment.

SUMMARY

In a particular implementation, a method includes receiving first surface data that includes three-dimensional (3D) point positions corresponding to a first portion of a surface of an object and receiving second surface data corresponding to a second portion of the surface of the object, the second portion of the surface at least partially overlapping the first portion of the surface. The method includes generating, based on the first surface data, first hole data that indicates a first position of a particular hole in the first portion of the surface and generating, based on the second surface data, second hole data that indicates a second position of the particular hole in the second portion of the surface. The method also includes matching the first position to the second position to perform an alignment with respect to the first surface data and the second surface data.

In another particular implementation, apparatus includes a hole detector configured to generate, based on first surface data that includes three-dimensional (3D) point positions corresponding to a first portion of a surface of an object, first hole data that indicates a first position of a particular hole in the first portion of the surface. The hole detector is also configured to generate, based on second surface data corresponding to a second portion of the surface of the object, second hole data that indicates a second position of the particular hole in the second portion of the surface. The apparatus also includes a hole aligner configured to determine at least one of a translation or a rotation to align one or more first hole positions in the first hole data with one or more second hole positions in the second hole data. The apparatus further includes a data aligner configured to perform an alignment with respect to the first surface data and the second surface data based on the at least one of the translation or the rotation.

In another particular implementation, a non-transitory, computer readable medium is disclosed that stores instructions that, when executed by a processor, cause the processor to initiate, perform, or control operations. The operations include receiving first surface data that includes three-dimensional (3D) point positions corresponding to a first portion of a surface of an object and receiving second surface data corresponding to a second portion of the surface of the object, the second portion of the surface at least partially overlapping the first portion of the surface. The operations also include generating, based on the first surface data, first hole data that indicates a first position of a particular hole in the first portion of the surface and generating, based on the second surface data, second hole data that indicates a second position of the particular hole in the second portion of the surface. The operations further include matching the first position to the second position to perform an alignment with respect to the first surface data and the second surface data.

The features, functions, and advantages described herein can be achieved independently in various implementations or may be combined in yet other implementations, further details of which can be found with reference to the following description and drawings.

DETAILED DESCRIPTION

Embodiments disclosed herein perform alignment with respect to sets of 3D point data, such as from three-dimensional (3D) scans of an object. In an implementation, first and second sets of 3D point data are processed to locate positions of holes, and an alignment process includes rotating, translating, or both, the positions of holes detected in the second set of the 3D point data to match the positions of the corresponding holes detected in the first set of the 3D point data. The rotation and translation that are determined to align the hole positions are then used to align the second set of 3D point data with respect to the first set of 3D point data. Additional refinement of the alignment with respect to the first and second sets of 3D point data may also be performed. By aligning the sets of 3D point data based on positions of holes, the scan data from multiple scans of the object can be automatically aligned even when the scanned object has a smooth, featureless surface.

Figure 1:
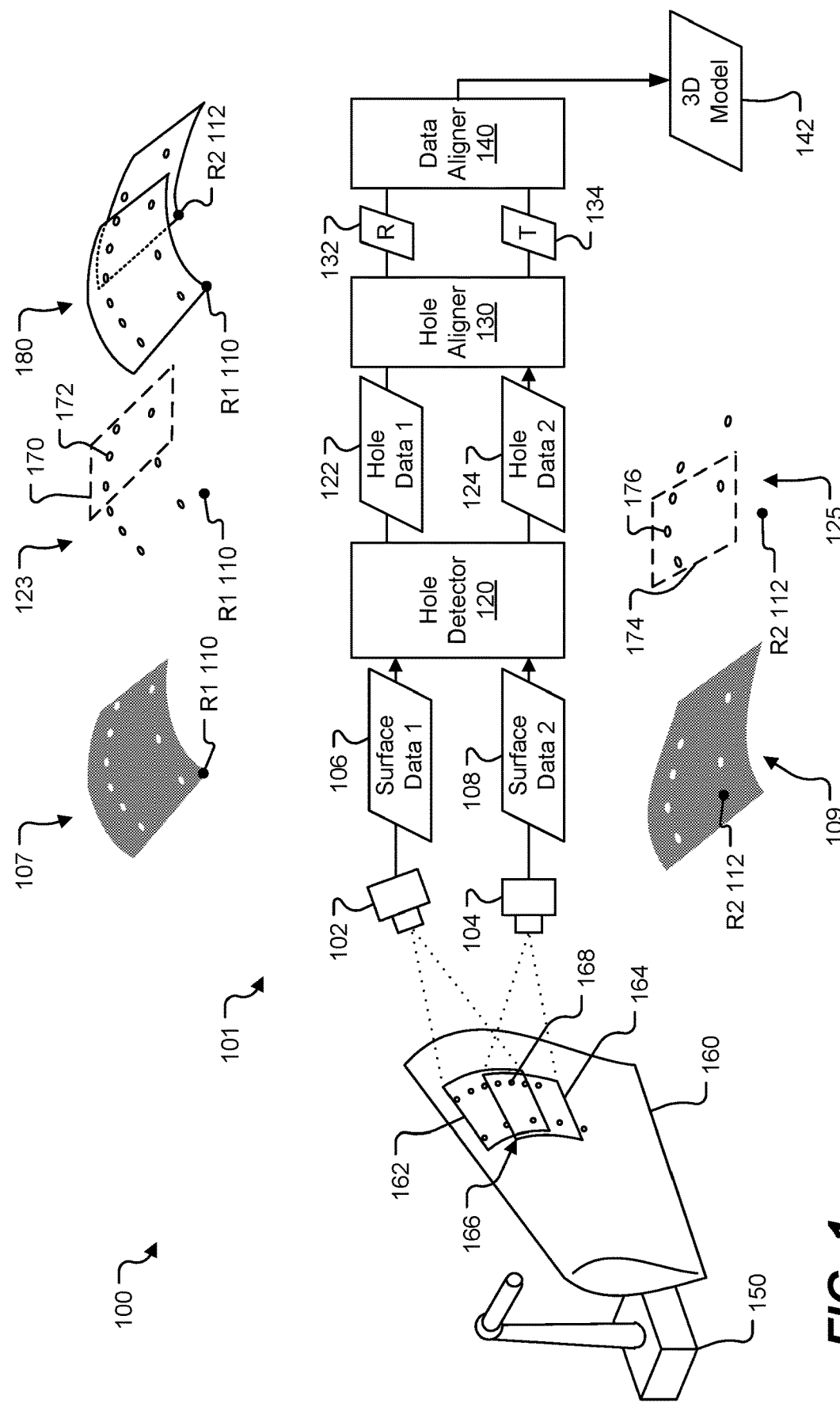
FIG. 1 is a diagram that illustrates a system configured to perform hole-based data alignment of 3D surface data of a scanned object.

Referring to FIG. 1, a system 100 is depicted that includes a 3D scanning apparatus 101, an object 160 and a robotic device 150. For clarity of explanation, a first point cloud 107, a second point cloud 109, a first hole feature cloud 123, a second hole feature cloud 125, and a combined point cloud 180 depict illustrative examples of stages of a hole-based alignment process at the 3D scanning apparatus 101. The 3D scanning apparatus 101 is configured to capture information regarding the surface of the object 160 as a series of patches or tiles and to piece together the patches or tiles to generate a 3D model 142. When the surface of the object 160 is relatively featureless, alignment or "registration" of the tiles based on feature matching can be difficult. Although the surface of the object 160 includes multiple holes, such as for rivets, wiring, or for other purposes, 3D surface data captured by the 3D scanning apparatus 101 represents such holes as a lack of 3D surface points, rather than as specific features that are easily identifiable. The 3D scanning apparatus 101 is configured to locate positions of holes in the surface of the object 160 in each captured patch and to use the detected locations of the holes to align the patches and enable generation of the 3D model 142. Thus, an accurate 3D depiction of the surface of the object 160 can be obtained, even for surfaces that are featureless other than then holes.

The 3D scanning apparatus 101 includes one or more 3D sensors, illustrated as a first 3D sensor 102 and a second 3D sensor 104, configured to perform a 3D scan of the object 160 to generate first surface data 106 and second surface data 108. The 3D scanning apparatus 101 also includes a hole detector 120, a hole aligner 130, and a data aligner 140. The first 3D sensor 102 is configured to generate the first surface data 106 representing a first portion 162 of the surface of the object 160. The second 3D sensor 104 is configured to generate the second surface data 108 representing a second portion 164 of the surface of the object. The hole detector 120 is configured to process the first surface data 106 and the second surface data 108 to generate first hole data 122 and second hole data 124. The hole aligner 130 is configured to perform an alignment with respect to of the first hole data 122 and the second hole data 124 (e.g., registration) to determine a rotation 132 and a translation 134 to be applied to one or both of the first hole data 122 or the second hole data 124 to generate aligned data. The data aligner 140 is configured to process the first surface data 106 and the second surface data 108 based on the rotation 132 and translation 134 to generate the 3D model 142.

In a particular implementation, the first 3D sensor 102 corresponds to a stereo camera, a time-of-flight camera, a laser scanner, a light detection and ranging (LIDAR) sensor, a structured light camera, one or more other 3D sensors, or combination thereof. The first 3D sensor 102 is aligned such that it captures the first surface data 106 corresponding to the first portion 162. The first surface data 106 includes 3D points (e.g., a list of points with three coordinates, such as (x, y, z)) that are graphically represented as the first point cloud 107, with each point in the first point cloud 107 having a position relative to a first reference (R1) 110.

The second 3D sensor 104 also corresponds to a stereo camera, a time-of-flight camera, a laser scanner, a LIDAR sensor, a structured light camera, one or more other 3D sensors, or combination thereof. In some implementations the first 3D sensor 102 and the second 3D sensor 104 includes the same type of sensor (e.g., laser scanners), and in other implementations the first 3D sensor 102 and the second 3D sensor 104 include different types of sensors (e.g., the first 3D sensor 102 includes a laser scanner and the second 3D sensor 104 includes a structured light camera). The second 3D sensor 104 is configured to capture the second surface data 108. For example, the second surface data 108 includes 3D surface data corresponding to the second portion 164, such as a collection of 3D points that are graphically represented as the second point cloud 109, with each point in the second point cloud 109 having a position relative to a second reference (R2) 112. The first surface data 106 and second surface data 108 each include a portion that corresponds to an overlap portion 166 of the first portion 162 and the second portion 164. The overlap portion 166 includes multiple holes, including a particular hole 168, that is representative of the holes in the overlap portion 166 that are used to perform an alignment with reference to the first surface data 106 and the second surface data 108.

The hole detector 120 is configured to receive the first surface data 106 and the second surface data 108 and to perform one or more detection processes to generate the first hole data 122 and the second hole data 124. The hole detector 120 is configured to generate, based on the first surface data 106 that includes 3D point positions corresponding to the first portion 162 of the surface of the object 160, the first hole data 122. The first hole data 122 indicates positions of holes in the first portion 162 of the surface of the object 160, graphically represented as the first hole feature cloud 123. The first hole data 122 indicates a first position 172 of the particular hole 168 relative to the first reference 110. The hole detector 120 is also configured to generate, based on the second surface data 108 corresponding to the second portion 164 of the surface of the object 160, second hole data 124. The second hole data 124 indicates positions of holes in the second portion 164 of the surface of the object 160, graphically represented as the second hole feature cloud 125. For example, the second hole data 124 indicates a second position 176 of the particular hole 168 relative to the second reference 112.

In an example, the hole detector 120 is configured to generate a rough estimate of hole locations using a mapping of each of the first surface data 106 to a grid and determining a density of points of each cell in the grid. As described further with reference to FIG. 4, cells in the resulting grid having a relatively low density of mapped 3D points may correspond to locations of holes. In a particular implementation, the hole detector 120 is configured to refine hole position estimates based on a process that includes determining a centroid of points within a neighborhood of an estimated hole location and refining the estimate based on the location of the centroid, such as explained in further detail with reference to FIG. 5. In another implementation, the hole detector 120 is configured to detect holes in the first surface data 106 and the second surface data 108 based on a 2-dimensional circle-fitting procedure, as described in further detail with reference to FIG. 6.

In some implementations, the hole detector 120 is also configured to receive two-dimensional (2D) images of the first portion 162 and the second portion 164. In an example, the hole detector 120 receives a 2D image of the first portion 162 from the first 3D sensor 102 and a 2D image of the second portion 164 from the second 3D sensor 104, such as when the first 3D sensor 102 and the second 3D sensor 104 include camera-type 3D sensors (e.g., structured light cameras) that are also configured to capture 2D images. In another example, the hole detector 120 receives the 2D images from one or more cameras (not shown) that are distinct from the first 3D sensor 102 and the second 3D sensor 104. In implementations in which the hole detector 120 receives the 2D images, the hole detector 120 is configured to generate a first 2D hole mask based on detected locations of holes from the 2D image of the first portion 162 and apply the first 2D hole mask as a texture to the first surface data 106, as described in further detail with reference to FIG. 8. The hole detector 120 is similarly configured to generate a second 2D hole mask based on detected locations of holes from the 2D image of the second portion 164 and apply the second 2D hole mask as a texture to the second surface data 108.

The hole aligner 130 is configured to perform an alignment with respect to the first hole data 122 and the second hole data 124, such as by matching the first position 172 to the second position 176 to perform an alignment with respect to the first surface data 106 and the second surface data 108. For example, the first hole feature cloud 123 indicates the first position 172 of the particular hole 168, relative to the first reference 110, within a first section 170 that corresponds to the overlap portion 166. The second hole feature cloud 125 indicates the second position 176 of the particular hole 168, relative to the second reference 112, within in a second section 174 that corresponds to the overlap portion 166. The hole aligner 130 is configured to determine at least one of the rotation 132 and the translation 134 to align one or more first hole positions in the first hole data 122 with one or more second hole positions in the second hole data 124 so that the hole locations in the first section 170 are substantially aligned with the hole locations of the second section 174. In an example, the hole aligner 130 is configured to rotate, to translate, or both, the second hole data 124 (e.g., rotate and translate an at least one of an orientation or a position of the second reference 112 with reference to the first reference 110) so that the center of the first position 172 corresponds to the center of the second position 176.

The data aligner 140 is configured to perform an alignment with respect to the first surface data 106 and the second surface data 108 based on the at least one of the translation 134 or the rotation 132. In an example, after the rotation 132 and translation 134 have been determined, the data aligner 140 applies the rotation 132 and the translation 134 to the second surface data 108 (e.g., to adjust a position and orientation of the second reference 112) to register the second surface data 108 with the first surface data 106 to generate the combined point cloud 180. In some implementations, the data aligner 140 further performs a refinement of the registration of the first surface data 106 and the second surface data 108. The data aligner 140 is further configured to combine the first surface data 106 and the second surface data 108 to generate the 3D model 142 of the object 160.

In some implementations, the 3D model 142 is used in one or more fabrication processes or design processes, such as for quality control (e.g., comparing the 3D model to a standard model to locate defects), visualization, robotic control, or simulation, as illustrative, non-limiting examples. In a particular example, the 3D model 142 is provided to the robotic device 150 for use in an operation on the object 160, and the robotic device 150 is controlled to interact with the object 160 based on the 3D model 142. For example, the 3D model 142 could be input to a robot path planning algorithm that creates instructions to guide the robot on a path along the surface while maintaining a given distance from the surface at all times. As another example, a robot could be instructed to go to each detected hole on the surface and perform some task, e.g. insert a rivet. As illustrated, the object 160 is a component of an aircraft and the robotic device 150 includes a robotic spray painter. The robotic device 150 is operative to perform precise application of paint to the surface of the object 160 in accordance with the modeled surface of the object 160 provided by the 3D model 142.

The 3D scanning apparatus 101 enables relatively high-precision capture of the surface of the object 160 as a series of patches or tiles, which may be relatively featureless, but are aligned by detection of holes and registration via matching hole locations in the various tiles to generate the 3D model 142. Determining alignment based on matching hole centers uses less memory and processing resources as compared to aligning based on matching entire point clouds. Although only two portions, e.g., first portion 162 and second portion 164, are illustrated, it should be understood that the system 3D scanning apparatus 101 is configured to scan all (or substantially all) of the object 160 using multiple overlapping patches to generate a full scan of the surface of the object 160. Thus, the 3D model 142 may be generated using relatively low process costs and at a relatively high accuracy as compared to methods that rely on feature detection of relatively featureless surfaces. A description of an example of operation of the system 3D scanning apparatus 101 is described in further detail with reference to FIG. 2.

Although two 3D sensors first 3D sensor 102, second 3D sensor 104, are illustrated, in other implementations, the system 3D scanning apparatus 101 may include a single 3D sensor more than two 3D sensors. For example, the 3D scanning apparatus 101 may include a sufficient number of 3D sensors to span an entire height of the object 160. As another example, the 3D scanning apparatus 101 may include a single 3D sensor that is repeatedly moved during the scanning operation to scan the surface of the object 160. In some implementations, the 3D sensors 102, 104 may be omitted and the hole detector 120 may process surface data that is received via another source, such as surface data received from a remote 3D scanner.

Although the hole detector 120, the hole aligner 130, and the data aligner 140 are depicted as separate components, in other implementations the described functionality of two or more of the hole detector 120, the hole aligner 130, and the data aligner 140 may be performed by a single component. In some implementations, each of the hole detector 120, the hole aligner 130, and the data aligner 140 may be represented in hardware, such as via an application-specific integrated circuit (ASIC) or a field-programmable gate array (FPGA), or the operations described with reference to the elements may be performed by a processor executing computer-readable instructions.

Figure 2:
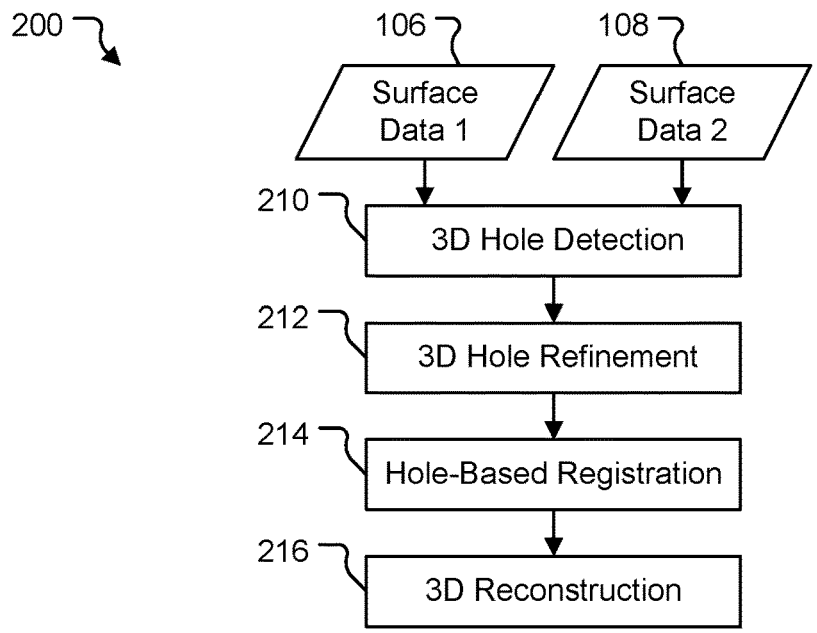
FIG. 2 is a diagram that illustrates a flow chart of an example of a method that may be performed by the system of FIG. 1.

FIG. 2 depicts an example of a method 200 that may be performed by the 3D scanning apparatus 101 of FIG. 1. The method 200 includes 3D hole detection of holes in the first surface data 106 and the second surface data 108, at 210. In a particular example, the 3D hole detection is performed by the hole detector 120, such as described with reference to FIG. 4, FIG. 6, FIG. 8, or a combination thereof.

The method 200 includes 3D hole refinement, at 212. Examples of 3D hole refinement performed by the hole detector 120 are described with reference to FIG. 5 or FIG. 6.

Figure 7:
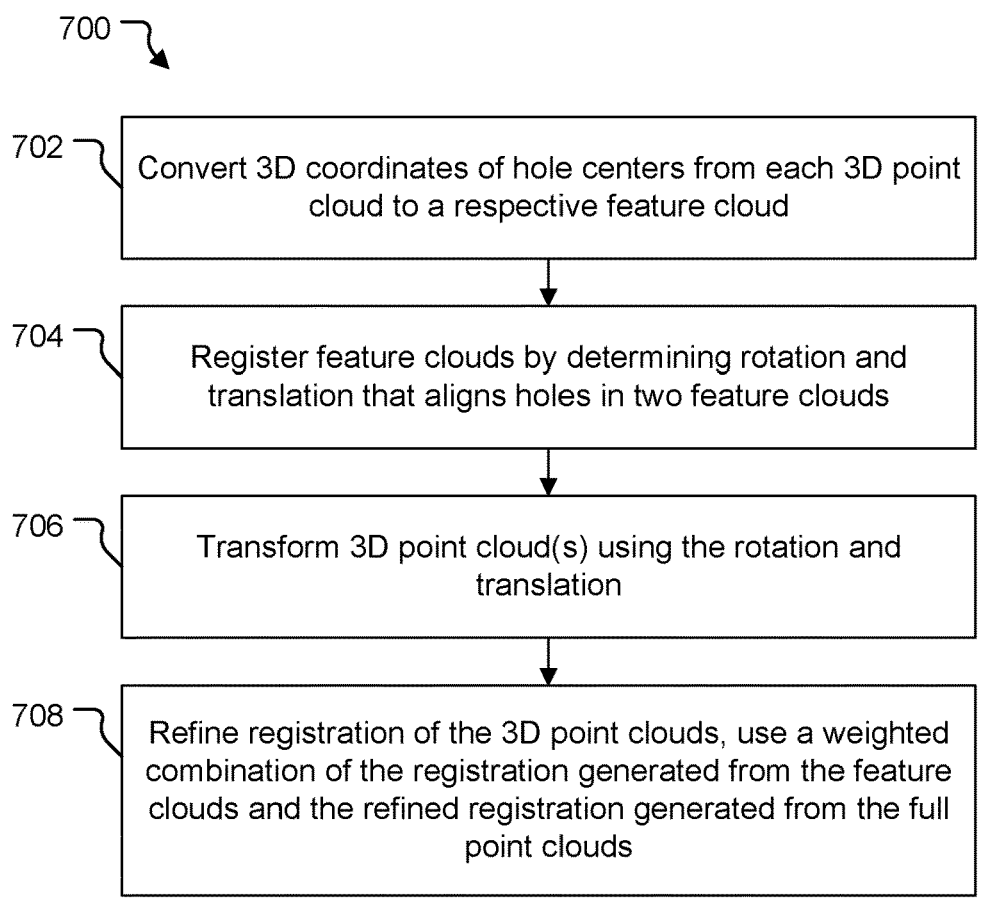
FIG. 7 is a diagram that illustrates a flow chart of an example of a method of performing hole-based registration that may be performed by the system of FIG. 1.

The method 200 includes hole-based registration, at 214. In a particular example, the hole-based registration is performed by the hole aligner 130. The hole-based registration includes performing a registration process to align the first hole data 122 and the second hole data 124 to generate the rotation 132 and the translation 134. After determining the rotation 132 and the translation 134, the rotation 132 and the translation 134 are applied to the first hole data 122 and the second hole data 124 to register the first hole data 122 and the second hole data 124. In some implementations, the rotation 132 and the translation 134 are further refined based on one or more registration refinement processes. Further details of the hole-based registration are illustrated in FIG. 7.

The method 200 includes 3D reconstruction, at 216. For example, the data aligner 140 generates the combined point cloud 180 by applying the rotation 132 and the translation 134 to the first surface data 106 and the second surface data 108. By generating the 3D model 142 based on hole detection in the first surface data 106 and the second surface data 108, the method 200 enables accurate registration of multiple patches resulting from a surface scan of the object 160 even when the surface of the object 160 is relatively featureless other than the holes.

Figure 3:
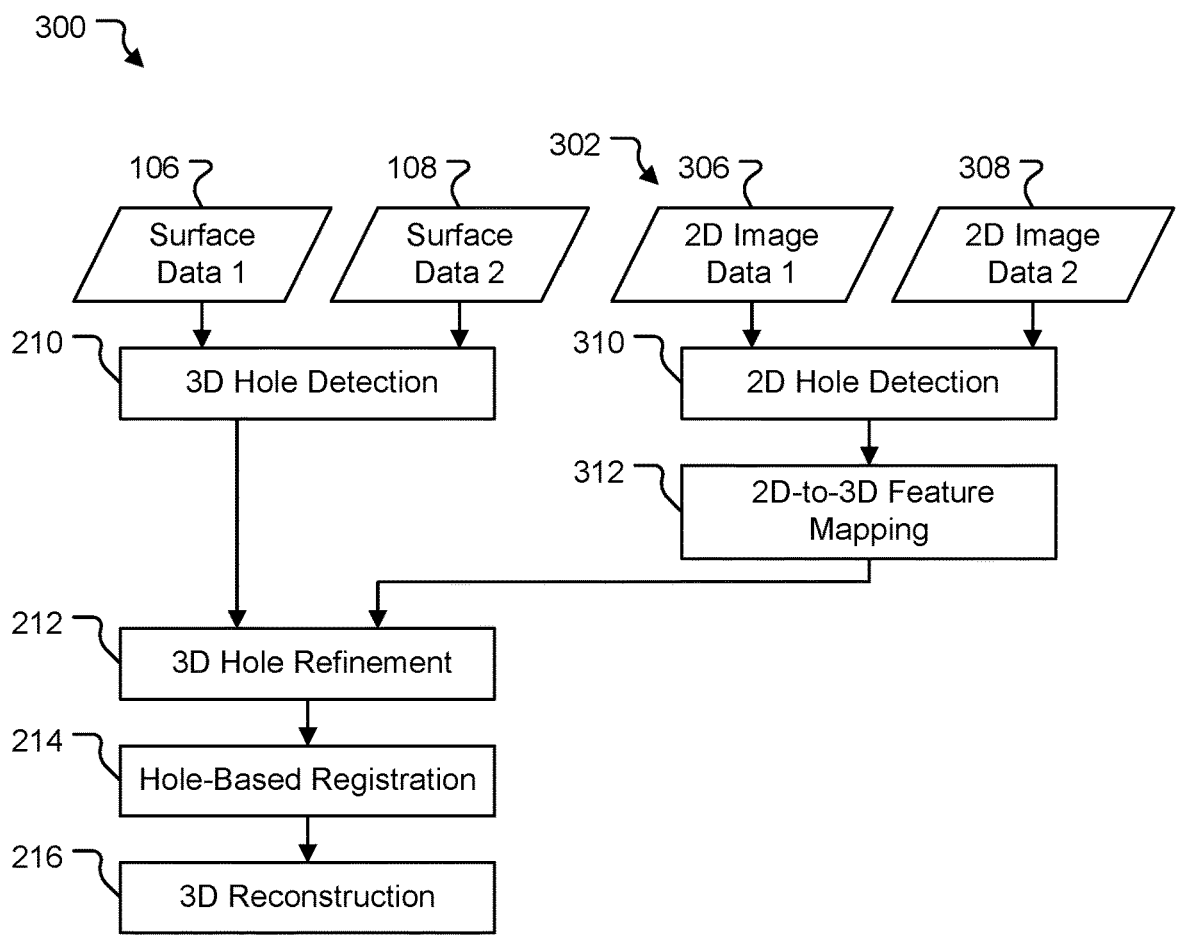
FIG. 3 is a diagram that illustrates a flow chart of another example of a method that may be performed by the system of FIG. 1.

FIG. 3 depicts a method 300 of registering the first surface data 106 and the second surface data 108. The method 300 includes the 3D hole detection, at 210, the 3D refinement, at 212, the hole-based registration, at 214, and the 3D reconstruction, at 216. In addition to receiving the first surface data 106 and the second surface data 108, the method 300 further includes receiving third surface data 302 that includes first 2D image data 306 and second 2D image data 308. The method 300 includes 2D hole detection, at 310. After detection of the holes in the first 2D image data 306 and the second 2D image data 308, a 2D-to-3D feature mapping is performed, at 312. Additional details of the 2D hole detection and the 2D-to-3D feature mapping are described with reference to FIG. 8. The 2D-to-3D feature mapping generates feature data that includes points of the first surface data 106 and the second surface data 108 that are within a specified distance of each detected hole location of the first 2D image data 306 and the second 2D image data 308. The results of the 2D-to-3D feature mapping are used in the 3D hole refinement as additional hole location data.

Use of the 2D image data enables enhanced accuracy of hole estimates using reduced computation resources as compared to detecting hole estimates based on 3D point data as in FIG. 2. By generating the 3D model based on hole detection in the first surface data and the second surface data, the method 300 enables accurate registration of multiple patches resulting from a surface scan of the object even when the surface of the object is relatively featureless other than the holes.

Figure 4:
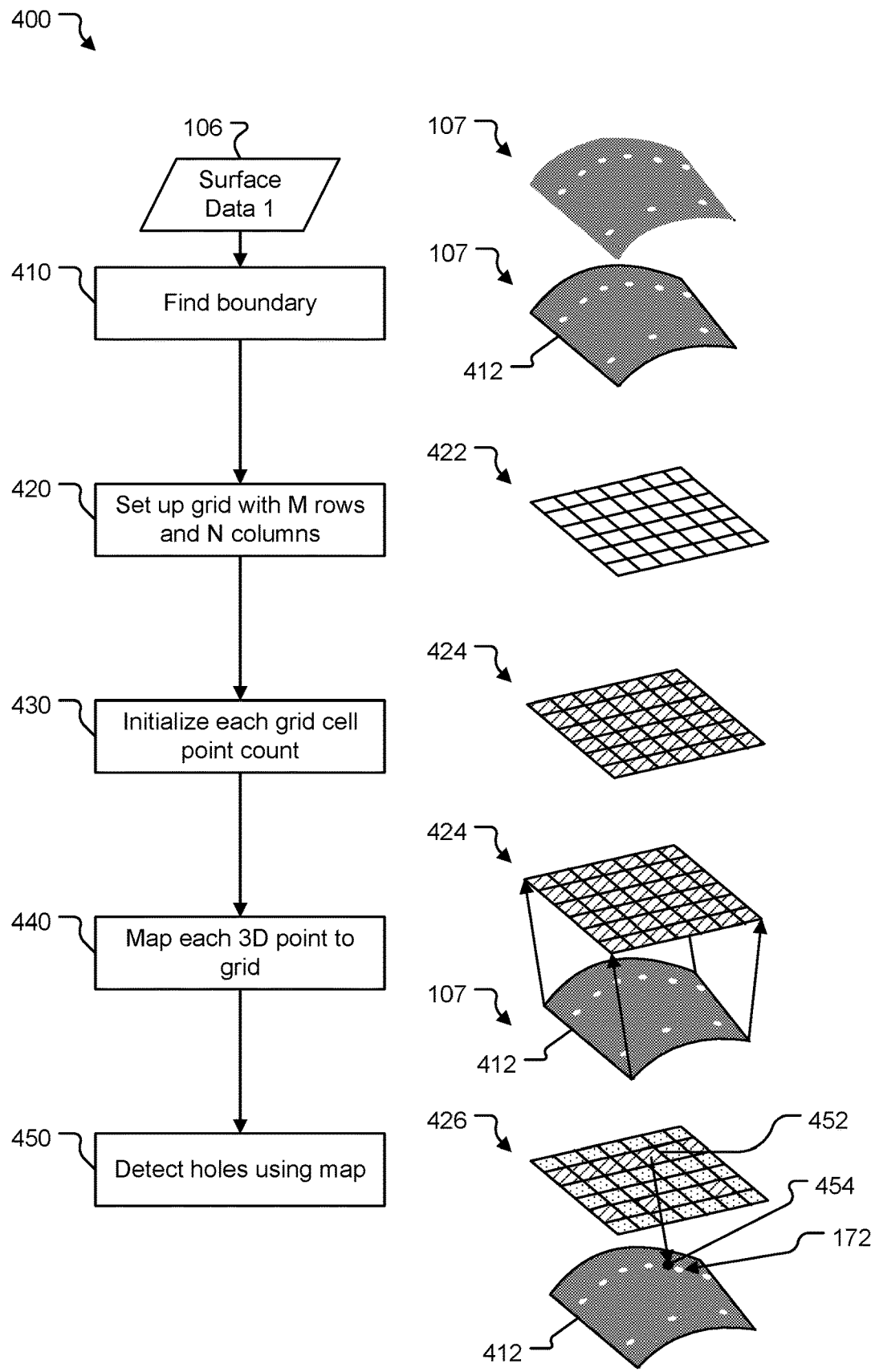
FIG. 4 is a diagram that illustrates a flow chart of an example of a method of performing 3D hole detection that may be performed by the system of FIG. 1.

FIG. 4 depicts a particular implementation of a method 400 that may be performed by the hole detector 120, such as during performance of the 3D hole detection of block 210 of FIG. 2 or FIG. 3. FIG. 4 also depicts illustrative examples of performing the method 400 with reference to the first point cloud 107. Approximate detection of hole centers is performed using a grid-based gap-finding process applied to the surface data (e.g., the first point cloud 107 that represents the first surface data 106 or the second point cloud 109 that represents the second surface data 108). Grid cells with low density of points are located, indicating the presence of a hole. In a particular example, the grid is constructed by finding the plane of best fit to the point cloud, finding the rectangular boundaries of the point cloud in that plane, and dividing the rectangle into grid cells. The points that fall within each grid cell are counted, and cells with a point count less than a threshold are labeled hole cells. Cells on the boundary of the point cloud are not considered. In some implementations, the size of the grid cell is set as smaller than the expected diameter of the holes to detect.

The method 400 includes finding a boundary corresponding to the surface data, at 410. For example, the first surface data 106 is processed to find a boundary. As illustrated, a boundary 412 is determined at edges of the first point cloud 107. The method 400 includes generating a grid with M rows and N columns, at 420. For example, the grid 422 is generated as a 2D array of cells. In a particular example, a nominal size of holes in the surface of the object 160 may be referenced from a part model or design of the object 160. The grid 422 is generated such that cells of the grid 422 have a size (e.g., a side length) that is smaller than the nominal size (e.g., diameter) of the holes. In this manner, a high contrast in point density between cells that correspond to holes and cells that do not correspond to holes enhances accuracy of locating hole centers.

Each grid cell has an associated point count, and the method 400 includes initializing the point count of each of the grid cells, such as to a zero value, at 430. Initializing of a point count value of each of the cells is illustrated as a hatched shading of each of the cells of an initialized grid 424.

The method 400 includes mapping each 3D point to the grid, at 440. As illustrated, a mapping is performed to map each point of the first point cloud 107 to a corresponding cell of the initialized grid 424. A count of the number of 3D points of the first point cloud 107 that are mapped to each particular cell in the initialized grid 424 is determined, resulting in a density map 426. In the density map 426, cells having a relatively high density of 3D points mapped to the cells (e.g. a high point count) are illustrated with dotted shading, and cells having relatively light density of 3D points mapped to the cell (e.g. a low point count) are illustrated with hatched shading. Cells that are the mapping destination of points at the boundary 412 have low point counts without being indicative of the presence of a hole and are therefore discarded.

The method 400 includes detecting holes using the map, at 450. To illustrate, a particular cell that is a mapping destination of a portion of the first point cloud 107 that includes a hole has a relatively low point count due to the absence of points at the hole. In some implementations, detection of the holes is performed by scanning the density map 426 to identify cells having a point count less than a particular threshold. Each of the identified cells may be indicative of a hole in a respective portion of the first point cloud 107. Initial estimates of locations of the holes in the first point cloud 107 can be determined by performing a reverse mapping, such as by mapping a center of a particular cell, such as cell 452, back to the first point cloud 107 to generate an estimation 454 of a position of a hole (e.g., an estimation of the first position 172).

Although FIG. 4 depicts mapping the point cloud to a rectangular grid, in other implementations the mapping may be performed to a surface other than a rectangular grid. For example, the points may be mapped to a surface of a cylinder, a parabolic surface, a spherical surface, or one or more other surfaces, to more accurately model the surface of the object represented by the 3D point data.

Figure 5:
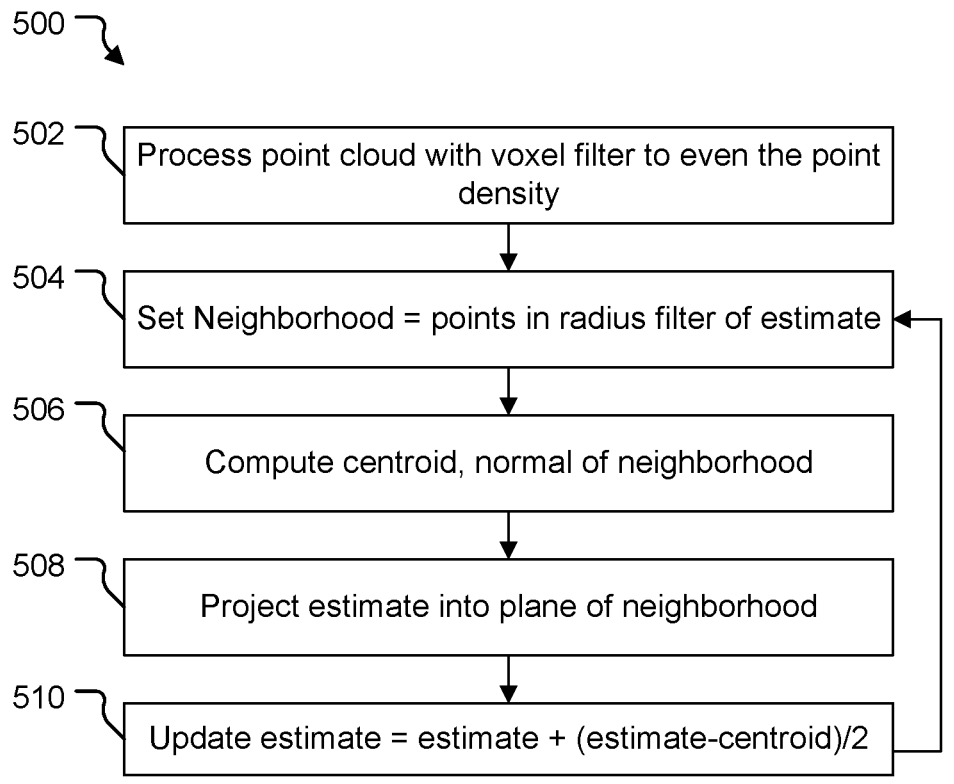
FIG. 5 is a diagram that illustrates a flow chart of an example of a method of performing 3D hole detection refinement that may be performed by the system of FIG. 1.
Figure 5:
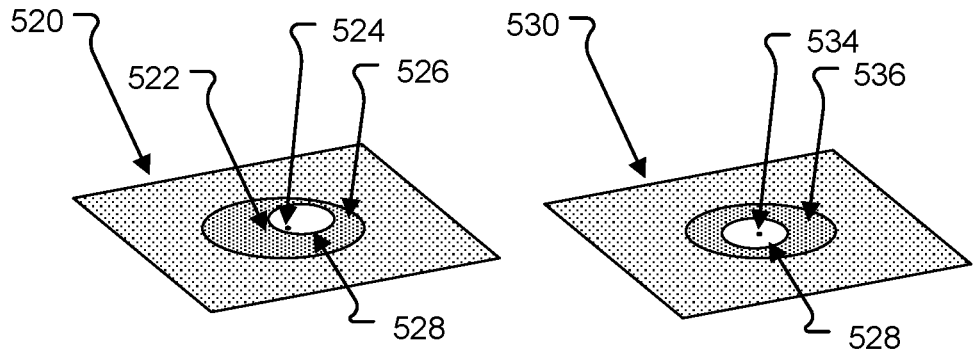
Figure 6:
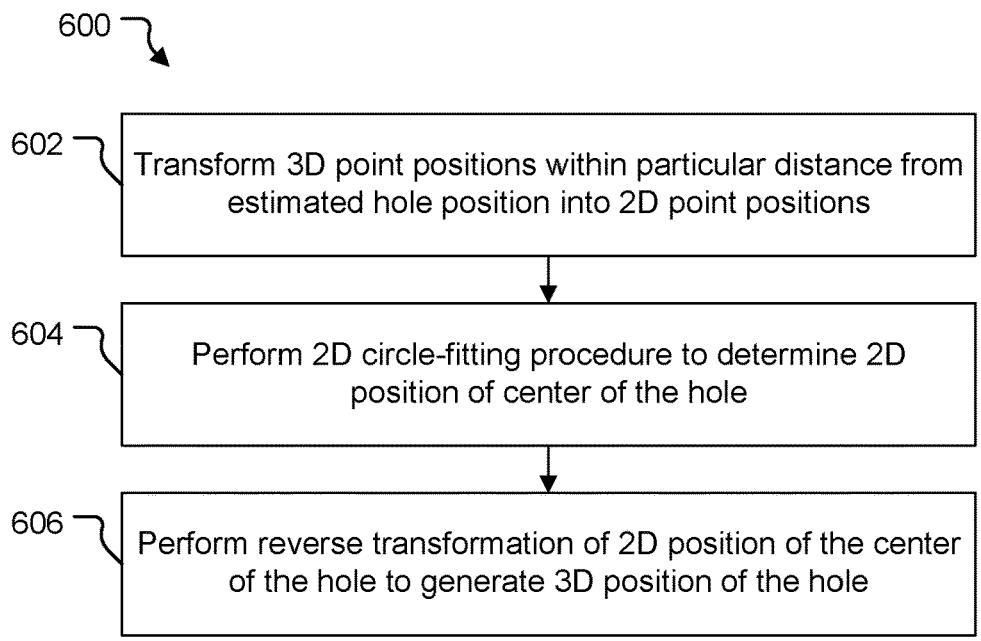
FIG. 6 is a diagram that illustrates a flow chart of another example of a method of performing 3D hole detection refinement that may be performed by the system of FIG. 1.

FIG. 5 and FIG. 6 provide alternative examples of hole position refinement performed by the hole detector 120, such as during performance of the 3D hole refinement of block 212 of FIG. 2 or FIG. 3. Hole position refinement includes processing data indicating approximate 3D hole centers, such as data generated by the 3D hole detection of block 210, and generating a more accurate estimate of the hole centers. FIG. 5 depicts a "centroid-shift" implementation that can produce more accurate results when 3D points exist around the circumference of each hole and in the surface surrounding each hole. FIG. 6 depicts a "2D-projection" implementation that can produce more accurate results when the point cloud around one or more holes is incomplete. In some implementations, the hole detector 120 is configured to determine point positions corresponding to the neighborhoods of estimated hole locations in the point cloud and to select between the 2D-projection implementation and the centroid-shift implementation based on whether the point cloud around one or more estimated hole locations is incomplete.

In the centroid-shift implementation of FIG. 5, a method 500 is illustrated that includes processing a point cloud with a voxel filter to even the point density, at 502. To illustrate, because the method 500 locates hole centers based on a centroid of the points in the neighborhood of an estimated position of the hole center, the points in the neighborhood are filtered so that a density of points in each unit of volume in the neighborhood is relatively constant. As a result, a centroid calculated for the filtered point cloud more accurately indicates a hole center location as compared to a centroid that is calculated based on points that are in non-hole regions but that a relatively low point density, points that are in regions having a relatively high point density, or a combination thereof.

The method 500 includes setting a neighborhood to include points that are within a particular radius of the estimated center of the hole, at 504. For example, a representative portion of a point cloud 520 in proximity to a hole 528 includes a neighborhood 526 of points (illustrated by darker shading) that are within a radius or a predetermined distance of an estimated hole center 524.

The method 500 includes computing a centroid 522 of the positions of the points in the neighborhood 526 and computing a normal of the positions of the points in the neighborhood 526, at 506. If the neighborhood is centered on the actual center of the hole (i.e., the estimated center of the hole is the actual center of the hole), the centroid matches the estimated center of the hole. If the estimated center of the hole is not the actual center of the hole, the direction from the centroid to the estimated center indicates the direction the estimated center should be shifted. In addition, the distance between the centroid and the estimated center is indicative of the distance between the estimated center and the actual center. In a particular implementation, the normal of the positions of the points indicates the normal vector to the best fit plane for the points. The best fit plane (or alternatively, the normal) can be used as a constraint on the estimated center of the hole.

The method 500 includes projecting the estimate of the hole center into the best fit plane of the neighborhood, at 508, and updating the estimate, at 510. For example, in the pseudocode below, the updated estimate is set to the original estimate of the center of the hole (after projection into the best fit plane), offset in the direction away from the centroid by an offset amount. The offset amount is equal to the difference between the estimated center of the hole and the centroid, divided by two. As illustrated, a second representative portion of the point cloud 530 depicts an updated estimate of the hole center 534 and an updated neighborhood 536. In some implementations, the method 500 terminates when the offset amount is determined to be smaller than a threshold. Otherwise, the method 500 initiates a next iteration by setting an updated neighborhood to include points that are within the particular radius of the updated estimate of the hole center, at 504.

An example of pseudocode corresponding to centroid-shift hole refinement is provided in Table 1, where "guess" indicates an estimate of the hole location.

TABLE 1

| Iteratively, until convergence: |
| --- |
| Neighborhood = Find points in radius filter of guess<br>Compute centroid, normal of neighborhood<br>Project guess into plane of neighborhood<br>Guess = guess + (guess − centroid) * .5 |

By iteratively setting a neighborhood in a radius of an estimated hole location, determining the centroid, and updating the estimate based on a distance between the estimate and the centroid, the estimated location of the holes iteratively refined until the estimated location and the centroid are in close proximity to each other. The operations depicted in FIG. 5 are suitable when there is a relatively large density of 3D points in the neighborhood of each hole location.

FIG. 6 depicts a method 600 of hole refinement using a 2D-projection implementation to improve accuracy of hole center estimates, such as generated by the method 400 of FIG. 4. The method 600 includes transforming 3D point positions of a point cloud that are within a particular distance from an estimated hole center into 2D point positions, at 602. The particular distance may equal the particular radius of FIG. 5 or may differ from the particular radius of FIG. 5. In a particular example, a plane is fit to the 3D points in the local neighborhood of the estimated hole center, and the 3D points are projected into the plane and assigned 2D point coordinates in the plane.

The method 600 includes performing a 2D circle fitting procedure to determine a 2D position of the center of the hole, at 604. For example, a 2D projection of the hole boundary may be detected based on detecting transitions between regions of the best fit plane having a high density of 2D points (i.e., the surface) and regions of the best fit plane having a low density of 2D points (e.g., the hole). A Levenberg-Marquardt-type procedure may be performed on the 2D points at the detected boundary to identify a best fit circle. The center of the best fit circle corresponds to an estimated 2D position of the center of the hole.

The method 600 includes performing a reverse transformation of the 2D position of the center of the hole to generate a 3D position of the particular hole, at 606. For example, the determined 2D position of the hole center may be unprojected to the original 3D coordinate system by reversing the projection of block 602.

By detecting the best fit circle using boundary points of a 2D projection of 3D points in a neighborhood of an estimated center of a hole, an estimated location of the center of the hole can improved even when the 3D point data in the neighborhood of the 3D hole boundary is incomplete. In some implementations, the refined hole estimates generated by the method 500 of FIG. 5 or by the method 600 of FIG. 6 are output by the hole detector 120, such as the first hole data 122 represented by the first hole feature cloud 123, the second hole data 124 output by the second hole feature cloud 125, or both, as illustrative examples.

FIG. 7 depicts a particular implementation of a method 700 that may be performed by the hole aligner 130 and the data aligner 140, such as during the hole-based registration of block 214 of FIG. 2 or FIG. 3. Multiple point clouds are registered using their hole features and a single consistent point cloud of is generated, such as the combined point cloud 180.

The method 700 includes converting the 3D coordinates of hole centers from each 3D point cloud to be registered into a respective 3D point cloud of the hole centers, at 702. Each resulting 3D point cloud of the hole centers is referred to as a "feature cloud." For example, the first hole data 122 is converted to the first hole feature cloud 123, and the second hole data 124 is converted to the second hole feature cloud 125. In a particular implementation, each hole feature cloud includes data describing the estimated location of the center of each hole detected in the corresponding point cloud (e.g., one set of coordinates for each hole).

The method 700 includes registering the feature clouds (e.g., hole centers in each feature cloud are aligned with corresponding hole centers the other feature clouds) by determining a rotation and a translation that aligns holes in the two feature clouds, at 704. As an illustrative example, the hole aligner 130 determines the rotation 132 and the translation 134 based on the first hole feature cloud 123 and the second hole feature cloud 125. In some implementations, the hole aligner 130 performs an iterative closest point (ICP)-type operation to register the hole feature clouds 123, 125.

The method 700 includes transforming one or more of the full 3D point clouds using the rotation and translation, at 706. In an illustrative example, the data aligner 140 transforms second point cloud 109 by the rotation 132 and translation 134 to register the second point cloud 109 with the first point cloud 107.

In some implementations, the method 700 includes refining the registration of the 3D point clouds, at 708. In an illustrative example, after applying the rotation 132 and the translation 134 to the second point cloud 109, the data aligner 140 also registers the first point cloud 107 with the transformed version of the second point cloud 109 using an ICP-type operation to further align features that may be detectable in the 3D point clouds. In some implementations, the refined registration of the 3D point clouds is used to generate the combined point cloud 180. In other implementations, the combined point cloud 180 is generated using a weighted combination of the registration generated from the feature clouds and the refined registration generated from the 3D point clouds, such as when feature detection in the 3D point clouds is less accurate than hole detection.

Using the method 700 enables registration of multiple scans (e.g., multiple sets of surface data) in a pair-wise manner. The use of hole centers as feature clouds can also be applied analogously to other multiple-cloud extensions of ICP-type registration operations.

Figure 8:
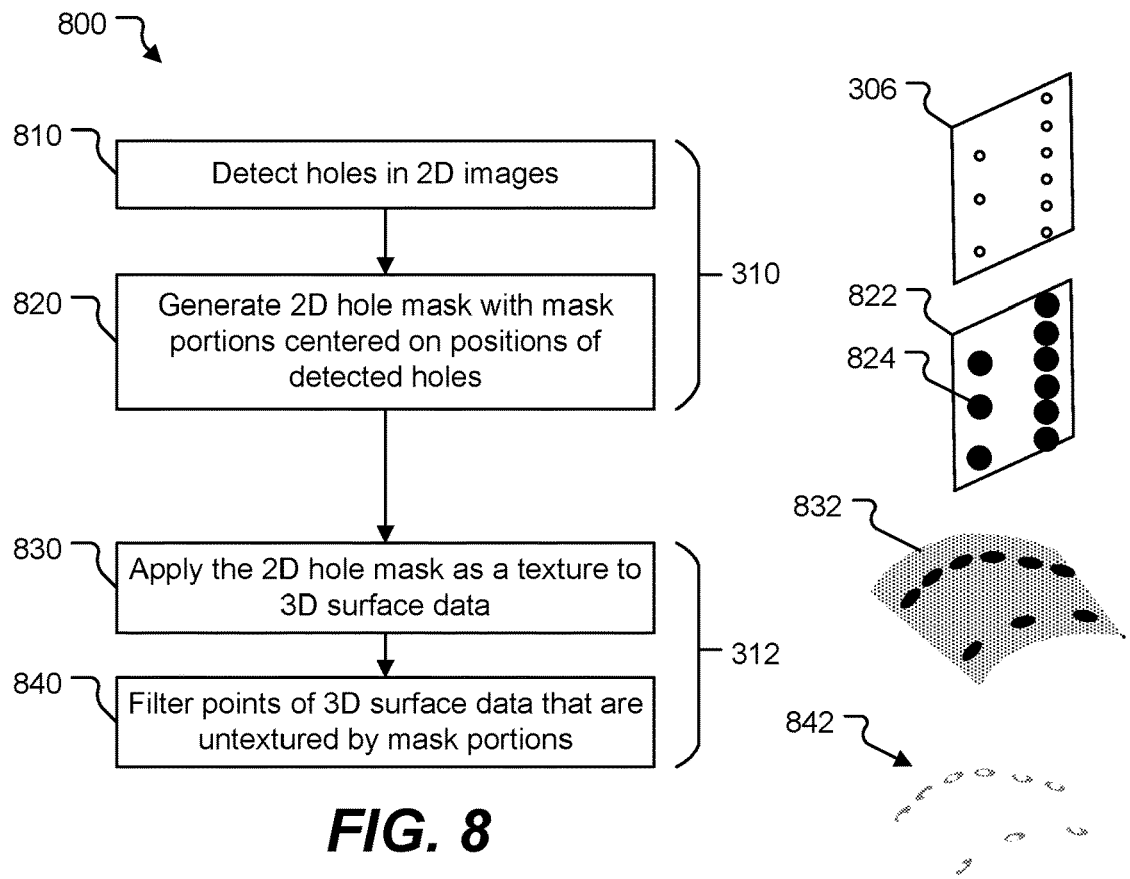
FIG. 8 is a diagram that illustrates a flow chart of an example of a method of performing hole detection that may be performed by the system of FIG. 1.

FIG. 8 depicts a particular implementation of a method 800 of processing 2D images to assist in hole detection. For example, the method 800 may be performed by the hole detector 120. As depicted in the implementation of FIG. 3, image data (e.g., the third surface data 302 that includes the first 2D image data 306 and the second 2D image data 308) are used to further refine estimated hole locations.

The method 800 includes detecting holes in the 2D images, at 810. For example, the holes may be detected in the first 2D image data 306 and second 2D image data 308. Hole detection may be performed using a Hough transform implementation or an edge detection implementation, as illustrative examples. In the Hough transform implementation, a Hough transform is used to detect the hole ellipses or circles in the images. In general, ellipse detection may result in more accurate detection than circle detection. However, when the holes appear substantially circular and computation time has a high priority, circle detection may be used in light of its higher efficiency. In the edge detection implementation, a Gaussian blur is applied to the image, followed by edge detection (e.g., Canny edge detection). Detected edges indicate hole locations.

The method 800 includes generating a 2D hole mask with mask portions centered on positions of the detected holes, at 820. As illustrated in FIG. 8, a 2D hole mask 822 includes mask portions, indicated as dark regions, centered on positions of detected holes of the first 2D image data 306 and having a radius larger than the hole radius. For example, a representative mask portion 824 corresponds to the particular hole 168.

The method 800 includes applying the 2D hole mask as a texture to the 3D surface data, at 830. An illustrative example 832 depicts the first surface data 106 textured using the 2D hole mask 822.

The method 800 includes filtering points of the 3D surface data that are untextured by the mask portions, at 840. For example, a reduced set of 3D surface data 842 includes the 3D points of the first point cloud 107 that are within a particular radius of the estimated centers of the holes have been removed and omits the remaining 3D points that are not textured by the mask portions.

The reduced set of 3D surface data 842 may be used for 3D hole refinement at the hole detector 120. The hole detection, at 810, and the 2D hole mask generation, at 820, may be performed as part of the 2D hole detection of block 310 of FIG. 3. Applying the 2D hole mask, at 830, and filtering points of the 3D surface data, at 840, may be performed as part of the 2D-to-3D feature mapping of block 312 of FIG. 3.

Figure 9:
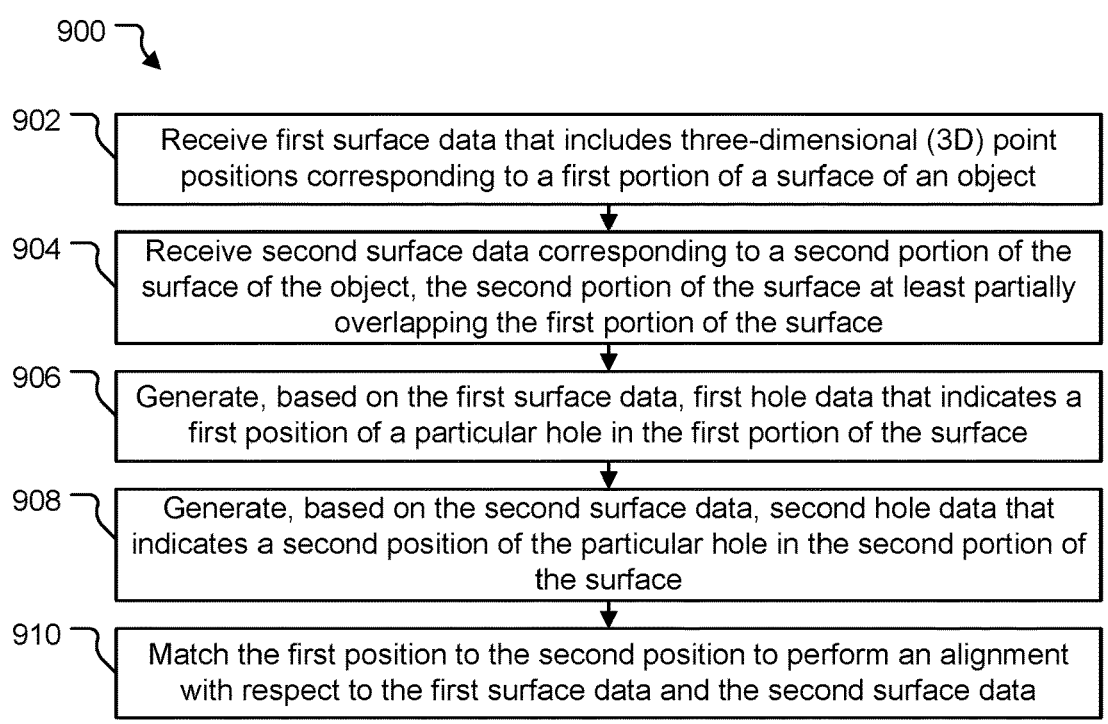
FIG. 9 is a diagram that illustrates a flow chart of an example of a method of performing hole-based data alignment that may be performed by the system of FIG. 1.

FIG. 9 depicts a method 900 of hole-based alignment. In a particular implementation, the method 900 is performed by the 3D scanning apparatus 101 of FIG. 1. The method 900 includes receiving first surface data 106 that includes three-dimensional (3D) point positions corresponding to a first portion of a surface of an object, at 902. For example, the hole detector 120 receives the first surface data 106 that includes 3D point positions corresponding to the first portion 162 of the surface of the object 160. In an illustrative example, the object includes a component of an aircraft.

The method 900 includes receiving second surface data corresponding to a second portion of the surface of the object, at 904. The second portion of the surface at least partially overlaps the first portion of the surface. For example, the hole detector 120 receives the second surface data 108 that corresponds to the second portion 164 of the surface of the object 160, and the second portion 164 of the surface at least partially overlaps the first portion 162. In some implementations, the method 900 also includes performing a 3D scan of the object to generate the first surface data and the second surface data, such as described with reference to the 3D sensors 102, 104 of FIG. 1.

The method 900 includes generating, based on the first surface data, first hole data that indicates a first position of a particular hole in the first portion of the surface, at 906. The method 900 also includes generating, based on the second surface data, second hole data that indicates a second position of the particular hole in the second portion of the surface, at 908. For example, the hole detector 120 generates, based on the first surface data 106, the first hole data 122 that indicates the first position 172 of the particular hole 168. The hole detector 120 also generates, based on the second surface data 108, the second hole data 124 that indicates the second position 176 of the particular hole 168.

In some implementations, generating the first hole data (e.g., the first hole data 122) includes generating an estimation of the first position (e.g., the estimation 454 of the first position). Generating the estimation of the first position includes mapping the 3D point positions to respective cells of a grid (e.g., the grid 424), identifying a particular cell (e.g., the cell 452) of the grid as being a mapping destination of relatively few 3D point positions, and determining the estimation of the first position based on a center location of the particular cell, such as described with reference to FIG. 4.

In some implementations, generating the estimation of the first position of the particular hole includes receiving third surface data (e.g., the third surface data 302) that includes two-dimensional (2D) image data (e.g., the first 2D image data 306) of the first portion of the surface and detecting, in the 2D image data, a position of the particular hole. The estimation of the first position of the particular hole is determined based on the detected position of the particular hole in the 2D image data, such as described with reference to FIG. 3. In an example, the estimation of the first position of the particular hole includes generating a 2D hole mask (e.g., the 2D hole mask 822) having mask portions (e.g., the mask portion 824) centered on positions of one or more holes detected in the 2D image data, applying the 2D hole mask as a texture to the first surface data, and filtering points of the first surface data that are untextured by the mask portions, such as described with reference to FIG. 8.

In some implementations, generating the first hole data further includes iteratively adjusting the estimation of the first position of the particular hole based on a position of a centroid of 3D point positions that are within a particular distance from the estimation of the first position, such as described with reference to FIG. 5.

In some implementations, generating the first hole data further includes transforming 3D point positions of the first surface data that are within a particular distance from the estimation of the first position of the particular hole into two-dimensional (2D) point positions, such as described with reference to block 602 of FIG. 6. A 2D circle-fitting procedure is performed to determine a 2D position of a center of the particular hole, such as described with reference to block 604 of FIG. 6. A reverse transformation of the 2D position of the center of the particular hole is performed to generate the first position of the particular hole, as described with reference to block 606 of FIG. 6.

The method 900 includes matching the first position to the second position to perform an alignment with respect to the first surface data and the second surface data, at 910. For example, the hole aligner 130 matches the first position 172 to the second position 176 to determine the rotation 132 and the translation 134, and the data aligner 140 uses the rotation 132 and the translation 134 to perform an alignment with respect to the first surface data 106 and the second surface data 108, such as described with reference to FIG. 7. In an illustrative example, the hole aligner 130 determines at least one of the translation 134 or the rotation 132 that aligns one or more first hole positions in the first hole data 122 with one or more second hole positions in the second hole data 124, and the one or more first hole positions and the one or more second hole positions correspond to holes in the overlap portion 166 of the surface. The data aligner 140 applies the at least one of the translation 134 or the rotation 132 to the second surface data 108 to register the second surface data 108 with the first surface data 106. In a particular example, the first position relates to a first reference (e.g., the first reference 110), the second position relates to a second reference (e.g., the second reference 112) that is different from the first reference, and the alignment adjusts at least one or a position or an orientation of the second reference with reference to the first reference.

In some implementations the method 900 includes, after performing the alignment with respect to the first surface data with the second surface data, combining the first surface data and the second surface data to generate a 3D model of the object, such as the 3D model 142. In an example, the method 900 includes controlling a robotic device (e.g., the robotic device 150, to interact with the object based on the 3D model.

Matching hole positions to perform an alignment with respect to multiple sets of surface data resulting from a surface scan of an object, as performed in the method 800, enables accurate registration of the sets of surface data even when the surface of the object is relatively featureless other than the holes.

Figure 10:
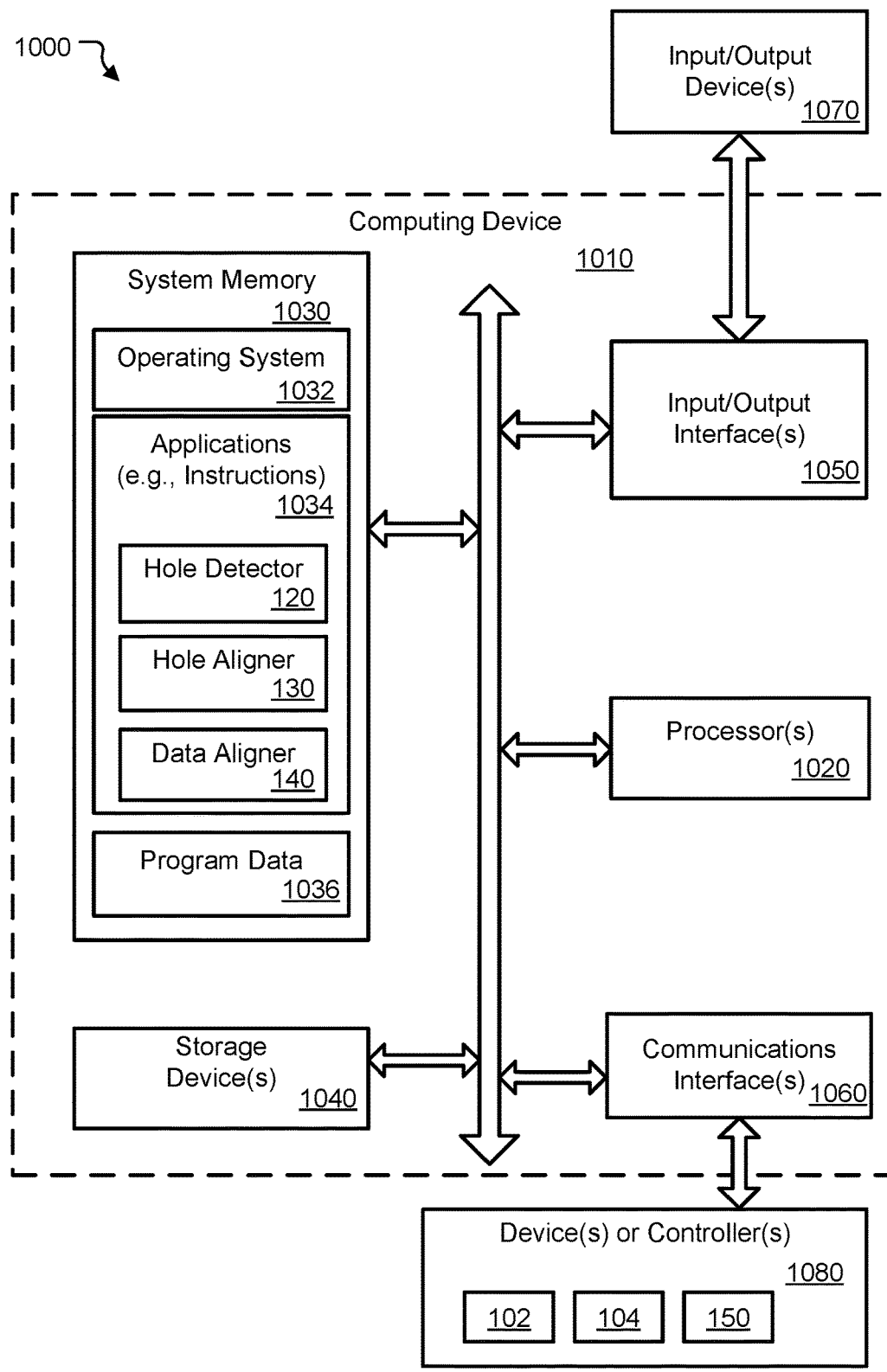
FIG. 10 is a block diagram of a computing environment including a computing device configured to support aspects of computer-implemented methods and computer-executable program instructions (or code) according to the present disclosure.

FIG. 10 is a block diagram of a computing environment 1000 including a computing device 1010 configured to support aspects of computer-implemented methods and computer-executable program instructions (or code) according to the present disclosure. For example, the computing device 1010, or portions thereof, is configured to execute instructions to initiate, perform, or control one or more operations described with reference to FIGS. 1-9.

The computing device 1010 includes one or more processors 1020. The processor(s) 1020 are configured to communicate with system memory 1030, one or more storage devices 1040, one or more input/output interfaces 1050, one or more communications interfaces 1060, or any combination thereof. The system memory 1030 includes volatile memory devices (e.g., random access memory (RAM) devices), nonvolatile memory devices (e.g., read-only memory (ROM) devices, programmable read-only memory, and flash memory), or both. The system memory 1030 stores an operating system 1032, which may include a basic input/output system for booting the computing device 1010 as well as a full operating system to enable the computing device 1010 to interact with users, other programs, and other devices. The system memory 1030 stores system (program) data 1036, such as the first surface data 106, the second surface data 108, the first hole data 122, the second hole data 124, data descriptive of the rotation 132, data descriptive of the translation 134, the 3D model 142, other data, or a combination thereof.

The system memory 1030 includes one or more applications 1034 (e.g., sets of instructions) executable by the processor(s) 1020. As an example, the one or more applications 1034 include instructions executable by the processor(s) 1020 to initiate, control, or perform one or more operations described with reference to FIGS. 1-9. To illustrate, the one or more applications 1034 include instructions executable by the processor(s) 1020 to initiate, control, or perform one or more operations described with reference to the hole detector 120, the hole aligner 130, the data aligner 140, or a combination thereof.

The one or more storage devices 1040 include nonvolatile storage devices, such as magnetic disks, optical disks, or flash memory devices. In a particular example, the storage devices 1040 include both removable and non-removable memory devices. The storage devices 1040 are configured to store an operating system, images of operating systems, applications (e.g., one or more of the applications 1034), and program data (e.g., the program data 1036). In a particular aspect, the system memory 1030, the storage devices 1040, or both, include tangible computer-readable media. In a particular aspect, one or more of the storage devices 1040 are external to the computing device 1010.

The one or more input/output interfaces 1050 that enable the computing device 1010 to communicate with one or more input/output devices 1070 to facilitate user interaction. For example, the one or more input/output interfaces 1050 can include a display interface, an input interface, or both. The processor(s) 1020 are configured to communicate with devices or controllers 1080 via the one or more communications interfaces 1060. For example, the one or more communications interfaces 1060 can include a network interface. The devices or controllers 1080 can include, for example, the first 3D sensor 102, the second 3D sensor 104, the robotic device 150, other devices, or a combination thereof.

In conjunction with the described systems and methods, an apparatus is disclosed that includes means for generating, based on first surface data that includes 3D point positions corresponding to a first portion of a surface of an object, first hole data that indicates a first position of a particular hole in the first portion of the surface and for generating based on second surface data corresponding to a second portion of the surface of the object, second hole data that indicates a second position of the particular hole in the second portion of the surface. For example, the means for generating may correspond to the hole detector 120.

The apparatus includes means for determining at least one of a translation or a rotation to align one or more first hole positions in the first hole data with one or more second hole positions in the second hole data. For example, the means for determining may correspond to the hole aligner 130.

The apparatus also includes means for performing an alignment with respect to the first surface data and the second surface data based on the at least one of the translation or the rotation. For example, the means for performing the alignment may correspond to the data aligner 140.

In some implementations, a non-transitory, computer readable medium stores instructions that, when executed by a processor, cause the processor to initiate, perform, or control operations to perform part or all of the functionality described above. For example, the instructions may be executable to implement one or more of the methods of FIGS. 2-9. In some implementations, part or all of one or more of the methods of FIGS. 2-9 may be implemented by one or more processors (e.g., one or more central processing units (CPUs), one or more graphics processing units (GPUs), one or more digital signal processors (DSPs)) executing instructions, by dedicated hardware circuitry, or any combination thereof.

The illustrations of the examples described herein are intended to provide a general understanding of the structure of the various implementations. The illustrations are not intended to serve as a complete description of all of the elements and features of apparatus and systems that utilize the structures or methods described herein. Many other implementations may be apparent to those of skill in the art upon reviewing the disclosure. Other implementations may be utilized and derived from the disclosure, such that structural and logical substitutions and changes may be made without departing from the scope of the disclosure. For example, method operations may be performed in a different order than shown in the figures or one or more method operations may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific implementations shown. This disclosure is intended to cover any and all subsequent adaptations or variations of various implementations. Combinations of the above implementations, and other implementations not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single implementation for the purpose of streamlining the disclosure. Examples described above illustrate but do not limit the disclosure. It should also be understood that numerous modifications and variations are possible in accordance with the principles of the present disclosure. As the following claims reflect, the claimed subject matter may be directed to less than all of the features of any of the disclosed examples. Accordingly, the scope of the disclosure is defined by the following claims and their equivalents.

What is claimed is:

1. A method comprising:
receiving first surface data that comprises three-dimensional (3D) point positions corresponding to a first portion of a surface of an object;
receiving second surface data corresponding to a second portion of the surface of the object, the second portion of the surface at least partially overlapping the first portion of the surface;
generating, based on the first surface data, first hole data that indicates a first position of a particular hole in the first portion of the surface, wherein generating the first hole data comprises:
generating a two-dimensional (2D) hole mask having mask portions centered on positions of one or more holes detected in 2D image data of the first portion of the surface;
applying the 2D hole mask as a texture to the first surface data; and
filtering points of the first surface data that are untextured by the mask portions to generate an estimation of the first position;
generating, based on the second surface data, second hole data that indicates a second position of the particular hole in the second portion of the surface; and
matching the first position to the second position to perform an alignment with respect to the first surface data and the second surface data.

2. The method of claim 1, wherein the object comprises a component of an aircraft.

3. The method of claim 1, further comprising, after performing the alignment with respect to the first surface data with the second surface data, combining the first surface data and the second surface data to generate a 3D model of the object.

4. The method of claim 3, further comprising controlling a robotic device to interact with the object based on the 3D model.

5. The method of claim 1, further comprising performing a 3D scan of the object to generate the first surface data and the second surface data.

6. The method of claim 1, wherein the alignment comprises performing a rotation, a translation, or a combination thereof, on the second surface data so that the first position and the second position are aligned.

7. The method of claim 1, wherein generating the first hole data comprises:
mapping the 3D point positions to respective cells of a grid;
identifying a particular cell of the grid as being a mapping destination of relatively few 3D point positions; and
determining the estimation of the first position based on a center location of the particular cell.

8. The method of claim 1, wherein generating the first hole data comprises:
receiving third surface data that comprises the 2D image data of the first portion of the surface; and
detecting, in the 2D image data, a position of the particular hole.

9. The method of claim 1, wherein matching the first position to the second position generates combined surface data, wherein the combined surface data comprises third hole data corresponding to the first hole data and the second hole data.

10. The method of claim 1, wherein generating the first hole data further comprises:
transforming 3D point positions of the first surface data that are within a particular distance from the estimation of the first position of the particular hole into 2D point positions;
performing a 2D circle-fitting procedure to determine a 2D position of a center of the particular hole; and
performing a reverse transformation of the 2D position of the center of the particular hole to generate the first position of the particular hole.

11. The method of claim 1, wherein generating the first hole data further comprises iteratively adjusting the estimation of the first position of the particular hole based on a position of a centroid of 3D point positions that are within a particular distance from the estimation of the first position.

12. The method of claim 1, wherein the first portion of the surface overlaps with the second portion of the surface at an overlap portion of the surface, and wherein matching the first position to the second position comprises:
determining at least one of a translation or a rotation that aligns one or more first hole positions in the first hole data with one or more second hole positions in the second hole data, the one or more first hole positions and the one or more second hole positions corresponding to holes in the overlap portion of the surface; and
applying the at least one of the translation or the rotation to the second surface data to register the second surface data with the first surface data.

13. The method of claim 1, wherein:
the first position relates to a first reference;
the second position relates to a second reference that is different from the first reference; and
the alignment adjusts at least one of a position or an orientation of the second reference with reference to the first reference.

14. An apparatus comprising:
a hole detector configured to:
generate, based on first surface data that comprises three-dimensional (3D) point positions corresponding to a first portion of a surface of an object, first hole data that indicates a first position of a particular hole in the first portion of the surface, wherein generating the first hole data comprises:
transforming 3D point positions of the first surface data that are within a particular distance from an estimation of the first position of the particular hole into two-dimensional (2D) point positions;
performing a 2D circle-fitting procedure to determine a 2D position of a center of the particular hole; and
performing a reverse transformation of the 2D position of the center of the particular hole to generate the first position of the particular hole; and
generate, based on second surface data corresponding to a second portion of the surface of the object, second hole data that indicates a second position of the particular hole in the second portion of the surface;
a hole aligner configured to determine an alignment with respect to the first surface data and the second surface data; and
a data aligner configured to perform the alignment.

15. The apparatus of claim 14, the data aligner further configured to combine the first surface data and the second surface data to generate a 3D model of the object.

16. The apparatus of claim 14, further comprising one or more 3D sensors configured to perform a 3D scan of the object to generate the first surface data and the second surface data.

17. The apparatus of claim 14, wherein:
the first portion of the surface overlaps with the second portion of the surface at an overlap portion of the surface;
the one or more first hole positions and the one or more second hole positions correspond to holes in the overlap portion of the surface; and
the data aligner is configured to apply at least one of a translation or a rotation to the second surface data to register the second surface data with the first surface data.

18. A non-transitory, computer readable medium storing instructions that, when executed by a processor, cause the processor to initiate, perform, or control operations comprising:
receiving first surface data that comprises three-dimensional (3D) point positions corresponding to a first portion of a surface of an object;
receiving second surface data corresponding to a second portion of the surface of the object, the second portion of the surface at least partially overlapping the first portion of the surface;
generating, based on the first surface data, first hole data that indicates a first position of a particular hole in the first portion of the surface, wherein generating the first hole data comprises iteratively adjusting an estimation of the first position of the particular hole based on a position of a centroid of 3D point positions that are within a particular distance from the estimation of the first position;
generating, based on the second surface data, second hole data that indicates a second position of the particular hole in the second portion of the surface; and
matching the first position to the second position to perform an alignment with respect to the first surface data and the second surface data.

19. The non-transitory, computer readable medium of claim 18, the operations further comprising, after performing the alignment with respect to the first surface data and the second surface data, combining the first surface data and the second surface data to generate a 3D model of the object.

20. The non-transitory, computer readable medium of claim 18, wherein the first portion of the surface overlaps with the second portion of the surface at an overlap portion of the surface, and wherein matching the first position to the second position comprises:
   determining the alignment; and
   applying the alignment to the second surface data to register the second surface data with the first surface data.

* * * * *